(12) United States Patent
Kurth

(10) Patent No.: US 10,173,318 B2
(45) Date of Patent: Jan. 8, 2019

(54) METHOD AND DEVICE FOR CONTROLLING A PERIPHERAL COMPONENT OF A ROBOT SYSTEM

(75) Inventor: Johannes Kurth, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 193 days.

(21) Appl. No.: 13/989,604

(22) PCT Filed: Oct. 31, 2011

(86) PCT No.: PCT/EP2011/005500
§ 371 (c)(1),
(2), (4) Date: May 30, 2013

(87) PCT Pub. No.: WO2012/069132
PCT Pub. Date: May 31, 2012

(65) Prior Publication Data
US 2013/0238132 A1    Sep. 12, 2013

(30) Foreign Application Priority Data

Nov. 24, 2010 (DE) ................ 10 2010 052 396

(51) Int. Cl.
*G05B 15/00* (2006.01)
*G05B 19/00* (2006.01)
*B25J 9/16* (2006.01)

(52) U.S. Cl.
CPC ... *B25J 9/1612* (2013.01); *G05B 2219/39115* (2013.01); *G05B 2219/39505* (2013.01); *G05B 2219/39558* (2013.01)

(58) Field of Classification Search
CPC ........ B25J 9/1612; B25J 13/082; B25J 15/08; B25J 9/1633; G05B 2219/39505;
(Continued)

(56) References Cited

U.S. PATENT DOCUMENTS 4,667,997 A * 5/1987 Udagawa ............... B25J 13/082
294/86.4
6,254,089 B1 * 7/2001 Becker .................. B41F 21/108
101/410

(Continued)

FOREIGN PATENT DOCUMENTS

CN           1052445 A      6/1991
CN         101199048 A      6/2008
(Continued)

OTHER PUBLICATIONS

Nikos C. Tsourveloudis, "Suction Control of a Robotic Gripper: A Neuro-Fuzzy Approach", May 14, 1999, Journal of Intelligent and Robotic Systems, pp. 215-235.*
(Continued)

*Primary Examiner* — Harry Y Oh
(74) *Attorney, Agent, or Firm* — Dorton & Willis, LLP

(57) ABSTRACT

In a method according to the invention for controlling a peripheral component (1) of a robot system (2), a power output, in particular a force, of the peripheral component is adjusted on the basis of an ascertained force ($F_1$; $m_3g + m_3 d(x_3)^2/dt^2$), said force acting dependent on at least one robot pose, in particular a robot path ($x_3(t)$).

21 Claims, 1 Drawing Sheet

(58) Field of Classification Search
CPC ........ G05B 13/021; G05B 2219/39322; G05B 2219/42092; G05B 2219/39558; G05B 2219/39115
USPC .......................................................... 700/260
See application file for complete search history.

(56) References Cited

U.S. PATENT DOCUMENTS

| | | | | |
|---|---|---|---|---|
| 6,419,291 | B1* | 7/2002 | Preta ................ | A61B 17/22031 294/119.3 |
| 7,677,622 | B2* | 3/2010 | Dunkmann .......... | B65G 47/917 294/188 |
| 8,408,153 | B2* | 4/2013 | Montgomery ............ | E02B 3/20 114/230.1 |
| 2002/0112899 | A1* | 8/2002 | Dijksman ............... | A47L 9/009 180/7.1 |
| 2004/0154518 | A1* | 8/2004 | Hadcroft ................ | B63B 21/00 114/230.1 |
| 2005/0159840 | A1* | 7/2005 | Lin ......................... | B23P 6/002 700/245 |
| 2006/0081166 | A1* | 4/2006 | Montgomery .......... | B63B 21/00 114/230.1 |
| 2006/0145494 | A1* | 7/2006 | Nihei ...................... | B25J 9/1612 294/106 |
| 2007/0255447 | A1* | 11/2007 | Dunkmann .......... | B65G 47/917 700/213 |
| 2008/0041421 | A1* | 2/2008 | Ha .......................... | A47L 5/365 134/18 |
| 2008/0077361 | A1* | 3/2008 | Boyd ..................... | B25J 9/1612 702/189 |
| 2008/0282500 | A1* | 11/2008 | Omagari .................. | B08B 5/02 15/415.1 |
| 2008/0312769 | A1* | 12/2008 | Sato ....................... | B25J 9/1633 700/249 |
| 2009/0076657 | A1* | 3/2009 | Tsuboi ................ | G05B 13/021 700/275 |
| 2010/0047051 | A1* | 2/2010 | Knobel .................. | B25J 9/1065 414/751.1 |
| 2010/0135760 | A1* | 6/2010 | Hjornet ................ | B25J 15/0616 414/744.8 |
| 2010/0178135 | A1* | 7/2010 | Laceky ................ | B25J 19/0029 414/217 |
| 2010/0239408 | A1* | 9/2010 | Becker ................. | B65G 47/918 414/800 |
| 2012/0073909 | A1* | 3/2012 | Kondo ...................... | B66B 5/02 187/247 |

FOREIGN PATENT DOCUMENTS

| | | |
|---|---|---|
| DE | 69703746 T2 | 5/2001 |
| DE | 102004042825 B3 | 1/2006 |
| EP | 2218557 A2 | 8/2010 |
| JP | H09-11176 A | 1/1997 |
| JP | 2001-287190 A | 10/2001 |
| JP | 4445038 B2 | 4/2010 |

OTHER PUBLICATIONS

Chinese Patent Office; Office Action in Chinese Patent Application No. 201180056692.6 dated Oct. 29, 2014; 15 pages.
Chinese Patent Office; Search Report in Chinese Patent Application No. 201180056692.6 dated Oct. 21, 2014; 3 pages.
European Patent Office; Search Report in International Patent Application No. PCT/EP2011/005500 dated Feb. 17, 2012; 6 pages.
Tsourveloudis et al.; Suction Control of a Robotic Gripper; published Mar. 2000; pp. 215-235.
Chinese Patent Office; Office Action in Chinese Patent Application No. 201180056692.6 dated Sep. 15, 2015; 15 pages.
European Patent Office; Examination Report in European Patent Application No. 11 779 349.7 dated Sep. 29, 2016; 7 pages.
Chinese Patent Office; Office Action in Chinese Patent Application No. 201180056692.6 dated Oct. 31, 2016; 5 pages.
German Patent Office; Office Action in related German Patent Application No. 10 2010 052 396.8 dated Feb. 20, 2018; 5 pages.

* cited by examiner

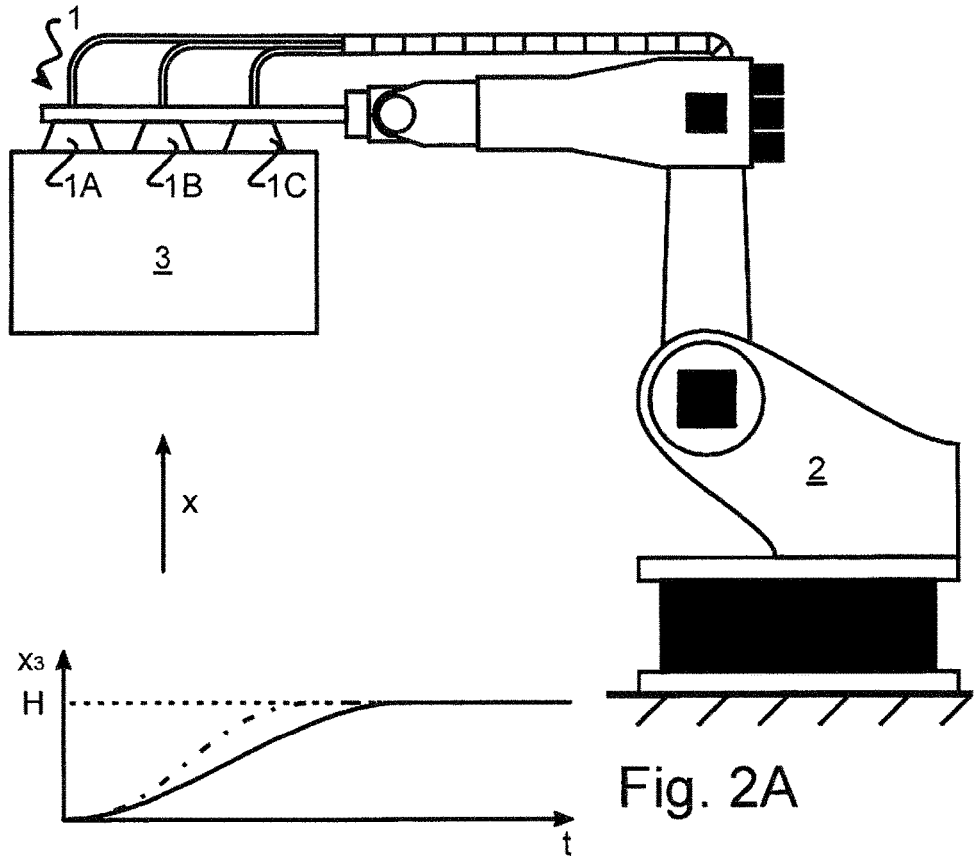
Fig. 1
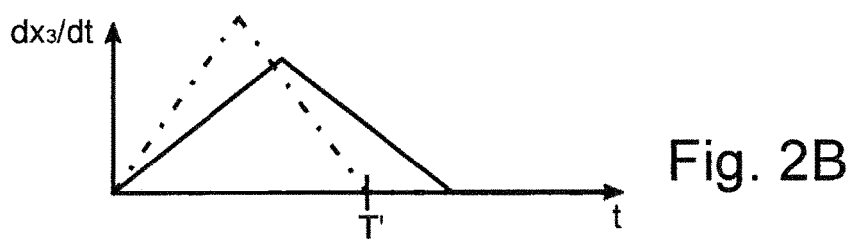
Fig. 2A
Fig. 2B
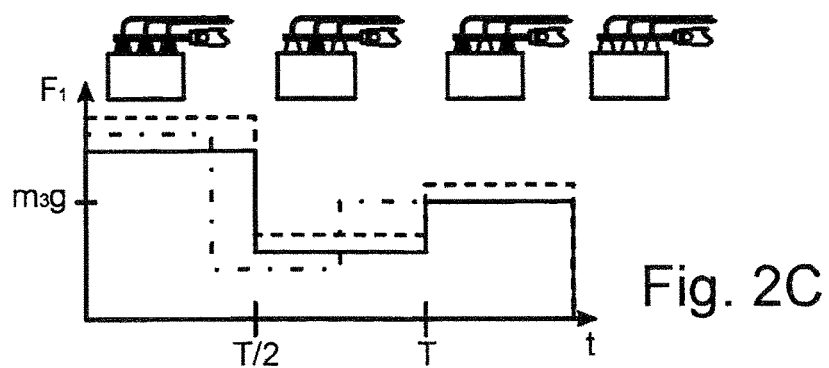
Fig. 2C

METHOD AND DEVICE FOR CONTROLLING A PERIPHERAL COMPONENT OF A ROBOT SYSTEM

The present invention relates to a method and a device for controlling at least one peripheral component of a robot system, in particular a robot-guided tool, as well as a computing means for specifying a power of the peripheral component.

While in the past in particular the flexibility, production rate and accuracy of robot systems, i.e. one or more, in particular cooperating robots, was optimized, under ecological and economical standpoints the focus has increasingly shifted to its energy consumption.

In operation, along with the robot/robots itself/themselves, i.e. their drives, peripheral component, for example pneumatic grippers, holding magnets and the like also consume energy. However, their power has at best been rudimentarily adapted to the process boundary conditions up to now, wherein for safety reasons usually maximum values were applied. The energy consumption of the robot system could be reduced by optimizing the power consumed or output by one or more peripheral component.

In the process a means within the meaning of the present invention can comprise software and/or hardware likewise, thus in particular a computer program or module or a computer or in particular a processing unit integrated into a robot, cell or system controller, but also a computer program product such as a data storage device or memory with a program saved to it, which in the event of execution carries out of an inventive method for specifying a power of a peripheral component and/or for controlling a peripheral component. The subsidiary claims relate to advantageous improvements.

The present invention is based on the idea of modifying a power, in particular a force that is exerted or can be exerted, of one or more peripheral component of a robot system during operation and thus adapting it to a force which acts during operation and which, as a rule depending on one or more robot poses, in particular an entire robot path, changes.

In the process, for a more compact presentation, presently also a total of individual forces, for example weight force, inertia forces and forces arising from the process such as for example friction forces, as well as anti-parallel force pairs, i.e. torques, will be referred to in generalizing manner as one force. Inversely one force within the sense of the present invention can also refer to one or more components, in particular in the active direction of a peripheral component, for example in the holding direction of a pneumatic gripper or holding magnet.

Within the sense of the present invention in particular a device that can be controlled and actuated by supplying power is understood as a peripheral component which is integrated into a work process of the robot system, in particular a tool, preferably for holding a workpiece or a payload, such as in particular a mechanical gripper, for example a clamping or pushing gripper, a pneumatic gripper, in which a low-pressure is generated vis-à-vis the surroundings in one or more nozzles, or an electromagnetic gripper with one or more controllable electromagnets for the pulling of a workpiece.

Referred to as power presently in generalization of the terminology customary according to the state of the art in particular is a power made available to a peripheral component by the system, a power consumed or output by a peripheral component in the physical sense, and also a force exerted by a peripheral component. It can in particular be set by the control of control valves, which can for example influence a compressed air supply of a pneumatic gripper, or be set by the control of an applied voltage, for example of one or more electromagnets and/or motors. In particular, the power of a peripheral component can be set by controlling its energy consumption. For example, the static holding force required for the holding of a workpiece can also constitute power within the sense of the present invention although in the process absent a route no power is accomplished in the physical sense. Correspondingly, a power within the sense of the present invention is also not restricted to the dimension of the power in the physical sense as a quotient of the product of work and path, divided by time, but rather can in particular, as explained above, be a force which peripheral component exerts or can maximally exert on the surroundings, in particular a workpiece, preferably a workpiece held or fixed by the peripheral component.

A setting of a power can, in addition to the specification of a pose or path section constant (i.e., control in the narrow sense of the word), also comprise a comparison of one or more fed back, recorded actual values with corresponding desired values (i.e., a regulation). For more compact presentation in the present description, both a control without feedback (forward control) as well as a regulation with feedback (feedback control) will be referred to herein as "setting" within the sense of the present invention, wherein in one preferred embodiment a desired power is predefined, compared to a recorded actual power, and the power is set on the basis of this control deviation.

A peripheral component can be stationary (i.e., its position relative to the complete robot system, say a base of a robot, does not change), for example as a holding tool of a machining table for the holding of a workpiece while the workpiece is machined by a robot-guided tool. In one preferred embodiment a peripheral component whose power is set in accordance with the invention is itself robot-guided. For example, a peripheral component in accordance with the present disclosure may be a tool, preferably a holding tool, on a tool flange of a robot of the robot system, which can comprise one or more robots. In one preferred improvement, the powers of a plurality of peripheral components are set, wherein the plurality of peripheral components may include both robot-guided and stationary components. For example, a holding force of a holding tool of a stationary machining table, in particular a hydraulic, pneumatic, (electro)magnetic and/or (electro)motive clamping device of a machining table, can be set on the basis of a determined force. The determined force may be a force which a robot-guided tool exerts on the workpiece dependent on the robot machining path or which appears as reaction force to such a machining force on the holding tool. In addition, or as an alternative, for example the holding force of a robot-guided holding tool, in particular of a hydraulic, pneumatic, (electro)magnetic and/or (electro)motive gripper, can be set on the basis of a determined force which a held workpiece exerts due to weight forces, inertia forces and gyroscopic forces on the holding tool.

In accordance with the invention, preferably, through a computing means, a force is determined which acts dependent on one or more robot poses, in particular a robot path, which can be predefined by successive poses.

The force can, for example, be a force which—in particular via a robot-guided workpiece—acts on the peripheral component. Similarly, the force can also be a force that acts on a robot-guided workpiece itself. In general, the force which is determined in accordance with the invention can be a so-called "inner" or "constraining" force. By the terms inner or constraining force, such a force is understood as is customary according to the state of the art, to be a force which is caused by mechanical attachments of the peripheral component and/or of a workpiece, for example the fixing of a workpiece by a peripheral component in one or more degrees of freedom, or in the context of a constraining force that is transferred and disappears outside of a system boundary around peripheral component and, if necessary, workpiece that is impacted by such a constraining force. Such a force can be determined in one preferred embodiment as a cutting force between a peripheral component and a workpiece when the peripheral component and the workpiece are cut free according to the Euler Cut Principle, conceptually, or also as a so-called constraining force secondary condition, which blocks specified degrees of freedom.

The force, which is determined in accordance with the invention, can likewise be a so-called external or impressed force. By external or impressed force is presently understood customary according to the state of the art a force that results from physical boundary conditions like gravitational or magnetic fields and/or movements and acts on peripheral component and/or workpiece.

In particular such an external or impressed force can comprise a weight force, in particular of peripheral component and/or of a workpiece, which can exhibit different directions and/or sizes in different poses. In the process it is to be considered that, as initially explained, the force which is determined in accordance with the invention if applicable can comprise only one or more components, for example in the active direction of the peripheral device.

In addition or as an alternative the force can comprise one or more inertia forces or components of it, in particular the product of mass/inertia sensor with the center of gravity-/rotary acceleration of the peripheral component and/or of a workpiece, wherein in particular also so-called gyroscopic forces, i.e. centrifugal and Coriolis forces or components thereof can constitute the force or a portion of said force determined in accordance with the invention.

In addition or as an alternative the force can comprise one or more process forces. In particular the force can comprise a friction or a component thereof, said component acting between the peripheral component, the workpiece and/or the surroundings.

The force that is determined in accordance with the invention can in particular depend on a state of the robot system, in particular of a robot and/or the peripheral component, and/or a state of a workpiece. In the process, in particular in manner that is customary according to the state of the art the location, i.e. position and/or orientation, and/or its, in particular first and second, time derivation can be referred to as state. Thus the force in particular of a pose of one or more robots of the robot system can depend for example on whether a griper supports a load from below or holds it from above or from the side. Correspondingly for example the inertia force acting on a load as a consequence of a rotary movement depends on the rotary movement, in particular of an angular velocity and acceleration. In general therefore the force determined in accordance with the invention can comprise in particular a movement-dependent and/or pose-dependent force.

In order to determine the force, it can, in particular during an operation of the robot system, be metrologically recorded. For example force sensors, say strain gauges or piezo sensors, which preferably can be arranged on the peripheral component, a robot and/or an interface between the two, in particular a tool flange of the robot, can record forces occurring during operation. In the determination a force determined in such manner can in a further design be further processed, for example filtered, transformed and/or discretized. In one preferred embodiment an actuator of a peripheral component acts at the same time as a sensor for recording a force. Thus for example from the power consumption of a position-controlled electromotor or of a pneumatic gripper the force exerted from said electromotor or pneumatic gripper can be determined. In one preferred improvement provision is made to record the force in advance during a trial operation of the robot system and take it as a basis for a later automatic operation as the determined force.

In addition or as an alternative the force can be estimated, preferably with the aid of a model. In particular from a mechanical substitute model that shows the dynamics of the movement of the robot system, the force can be determined which acts for example between a load and a gripper holding it. In general the estimate can take place during operation, in particular in consideration of recorded momentums such as linkage positions, speeds and/or accelerations of the robot system, in place of or in addition to the metrological recording in order for example to inspect it, to compensate it or to record non-observable forces. In one preferred design the force, in particular in the case of planned or taught paths can be estimated in advance.

In particular in this case it can be advantageous to adjust the force during an operation of the robot system, say in order to compensate model inaccuracies. In this connection it is pointed out that a mathematical estimate can exhibit a random degree of accuracy. An adjustment during operation can for example take place on the basis of recorded readings for forces which were described above. It is equally possible to adjust the force for example to a modified path speed with which the robot system follows a predefined path. This can take place in a simple embodiment by an increase or reduction that is proportional to a change of the path speed for which the force was determined and the power predefined, or proportional to a polynomial, in particular of a power of such a change. In an elaborate, more accurate embodiment a model of the robot system can be evaluated during operation and the power can be correspondingly adjusted.

In accordance with the invention a power, in particular a force of at least one peripheral component of the robot system is now set on the basis of the determined force. In the process, in one preferred embodiment provision is made that the power of the peripheral component is minimized. In general it can, in particular pose-dependently and/or in path sections, be reduced vis-à-vis a maximum power, as it accumulates during operation at a maximum on the peripheral component, in particular is consumed or emitted by said peripheral component. In particular a force exerted by a peripheral component can be reduced preferably pose-dependently and/or in path sections, as it is or must be maximally exerted by the peripheral component.

In the process, in particular a quantity of the power of the peripheral component can be set continuously, thus for example be predefined dependent on a robot pose or robot path with continuously or quasi-continuously varying values, wherein preferably the power is regulated dependent on a control deviation between predefined power and power determined during the operation.

Similarly the quantity of the power of the peripheral component can also be set discretized. In one preferred embodiment this can take place by optionally connecting and disconnecting component means for example by optionally connecting or disconnecting one or more pneumatic nozzles of a pneumatic gripper in order to increase or reduce its power in line with demand. In one preferred improvement the connection or disconnection of component means takes place such that the active component means form a symmetrical arrangement. In addition or as an alternative the connection or disconnection of component means can take place such that the peripheral component exerts the greatest possible or least possible torque.

The power of the peripheral component can be set continuously via a path of the robot system, which is referred to as robot path for short, by for example having a computing means in a control cycle connect or disconnect pneumatic nozzles of a pneumatic gripper depending on their respective positions on the path. Similarly the power can also be discretized on the input side. In particular discrete switching points can be provided along the path, upon which said switching points being reached the power of the peripheral component is modified. This offers the advantage that switching point functionalities which are already implemented today in many robot system controllers, can be used for implementation of the present invention, i.e. of the setting of the power of the peripheral component on the basis of a determined force which acts dependent on a robot pose or robot path.

In one preferred embodiment the power of the peripheral component is only set on the basis of the determined force, in case or as long as no override signal is present. An override signal in this preferred design makes possible the overriding of the inventive setting of the power of the peripheral component on the basis of a determined force, in case this is necessary, in particular instead of that a setting of the power of the peripheral component to a predefined value assigned to the override signal.

An override signal within the sense of the present invention can in particular be an emergency stop signal or the absence of one, for example an override signal monitored by means of a watchdog functionality. For example, if an emergency stop is triggered it can be advantageous to stop a workpiece regardless of an energy optimization for safety reasons with increased, in particular maximum possible or permissible holding force in order to safely prevent a loss of the workpiece due to the high delays occurring in the event of an emergency stop. Therefore, in one preferred embodiment in general provision is made that in the case of the presence of the override signal the power, in particular the force of the peripheral component is set to a predefined value, preferably the maximum possible or permissible value.

A peripheral component can, in particular due to control lags, mechanical, hydraulic or other reaction inertia and the like require a certain time until a desired power is set, i.e. until a true actual power, in particular actual force, at least within the scope of a control tolerance, corresponds to a set value. Therefore in one preferred design provision is made that a robot movement for compensation of a reaction inertia or reaction time of the peripheral component is delayed and/or slowed down. For example if a holding force of a robot gripper has to be increased for a specified path section, the traveling of this path selection can be delayed by a predefined time period, so that it is ensured that the robot gripper has established the higher holding force when this path section has been traveled.

Advantageously this aspect can in particular be combined with the foregoing explained aspect of the override signal, for example in the event of an emergency stop of the category STOP 1 or STOP 2 by delaying the traveling of a braking ramp by a few milliseconds in order to give a robot gripper time to establish a maximum holding force required for this purpose. The reaction inertia of the peripheral component can for example be empirically or mathematically determined or in a simple variant be roughly estimated for one or more peripheral components. In general therefore in one preferred design provision is made that a robot control, in particular a robot movement, on the basis of a peripheral component whose power is set, is modified in particular on the basis of a reaction inertia or reaction time of the peripheral component, in particular delayed and/or slowed down, preferably by a predefined value. The predefined value can depend on the peripheral component, for example being lower for reaction faster peripheral components. Similarly it is possible to predefine a value in general which will be used for all peripheral components. Preferably the predefined value is at most 10 ms, in particular at most 5 ms.

One inventive computing means serves the purpose of predefining a power, in particular a force of a peripheral component of a robot system on the basis of a determined force, which acts dependent on at least one robot pose, in particular a robot path. This can, as explained above, be implemented in software and/or in hardware and in particular carry out a model supported, at least partially automated estimate of the force. Similarly it is also possible to record the occurring force during a trial operation in advance or online during operation and set the power on the basis of this recorded force. The determination in advance, in particular with the assistance of a model of the robot system and of a robot path known in advance, in particular planned, in contrast to a power setting during operation on the basis of a force recorded in the process advantageously makes possible an anticipatory power setting. In particular in the case of a setting on the basis of a force recorded in operation it can be advantageous to multiply the determined force by a safety factor that is greater than 1 in order also to be able to make available a sufficient power to the peripheral component in the case of unforeseen accelerations or contacts. In general in one preferred design of the present invention provision is made that a recorded or estimated force is increased by a predefined, preferably path-dependent safety factor in order to determine the force on whose basis in accordance with the invention a power of a peripheral component is to be set.

Additional advantages and features arise from the subsidiary claims and the exemplary embodiments. To this end, the figures show the following, partially schematized:

FIG. 1: shows a robot system with a peripheral component;

FIG. 2: shows profiles of state variables of the robot system of FIG. 1; and

FIG. 2c shows profiles of a power of the peripheral component of FIG. 1 which is controlled according to a design of the present invention.

FIG. 1 shows a robot system in the form of a palletizing cell with a six-axle articulated arm robot 2 with a robot-guided peripheral component in the form of a pneumatic gripper 1 with three component means in the form of suction or pneumatic nozzles 1A-1C, whose pressure is individually controlled through optional connection or separation with a low-pressure reservoir (not shown in the figure) by a setting and computing means which is integrated into a controller of the robot 2 or of the palletizing cell (not shown). The optional impact of a suction nozzle is understood as setting the power of the pneumatic gripper 1 within the sense of the present invention, since with this a holding force applied by the pneumatic gripper is set.

The robot grips a workpiece or a load 3, for example a packet, and lifts it vertically upward, where it sets it down, after another robot has gone underneath it (not shown in figure). This is described by the x-coordinate of the TCP of the robot 2 or of the center of gravity of the payload 3 which is raised from the initial height 0 to the height H which it reaches in the initial case at time T or T' (cf. FIG. 2, in particular FIG. 2A).

To this end, for example by a path planning in advance or by teaching, a corresponding robot path $x_3=x(s)$ is predefined, which the robot 2 travels with a predefined speed profile s=s(f), wherein s is a path parameter and t denotes the time. Purely for illustrative purposes two predefined time profiles are shown, as they arise from the industry standard acceleration trapeze profiles, for one $$\begin{Bmatrix} 0 \leq t < \frac{T}{2} \\ \frac{T}{2} \leq t < T \\ sonst \end{Bmatrix} \Leftrightarrow \begin{Bmatrix} \frac{dx_3}{dt} = \left(\frac{4 \cdot H}{T^2}\right) \cdot t \\ \frac{dx_3}{dt} = \left(\frac{4 \cdot H}{T^2}\right) \cdot (T-t) \\ 0 \end{Bmatrix}, \quad (1)$$

[sonst=else]
which is shown in solid lines in FIG. 2, as well as the dotted line profile in FIG. 2, in which case T is replaced by T'>T.

From a simple model the force F1 can be determined for this predefined movement, said force which the gripper 1 must exert to this end on the load 3. It arises after virtually cutting free the load 3 from the gripper 1 and its replacement by the constraining force F1 from the principle of conservation of momentum:

$$m_3 \cdot \frac{d^2 x_3}{dt^2} = -m_3 \cdot g + F_1 \quad (2)$$

with (1) and the gravity vector g to $$\begin{Bmatrix} 0 \leq t < \frac{T}{2} \\ \frac{T}{2} \leq t < T \\ \text{Last gehalten} \\ \text{ohne Last} \end{Bmatrix} \Leftrightarrow F_1 = m_3 \cdot \begin{Bmatrix} \left(g + \frac{4 \cdot H}{T^2}\right) \\ \left(g - \frac{4 \cdot H}{T^2}\right) \\ g \\ 0 \end{Bmatrix} \quad (3)$$

[Last gehalten=load held, ohne Last=without load]
and is indicated in FIG. 2C for the two profiles shown in FIGS. 2A, 2B correspondingly in solid lines or in dotted lines. One recognizes that through the gripper 1 during the lifting with constant positive acceleration ($0 \leq y < T/2$) additionally inertia forces $m_3 d^2 x/dt^2$ are to be compensated to weight force $m_3 g$, which inversely reduce the holding force to be applied during the braking phase ($T/2 \leq t < t$), said holding force in an idle state in the case of a held load whose weight force the equilibrium holds and is otherwise equal to zero. In addition in FIG. 2C through the comparison of the solid line profile with the dotted line profile, which represents a lifting in the shorter time T', it can be recognized that in the case of more rapid lifting correspondingly higher inertia forces occur.

In accordance with the invention the force to be rendered by the pneumatic gripper 1 is determined, for example, as shown above for a simple example, through model-supported estimation of the constraining force $F_1$. In general for a robot system for which via the minimum coordinates q, for example the linkage positions of its robot or its robots are described, the movement r(t) of a load is described by these minimum coordinates, wherein constraining forces which act between the load and the robot or robots, in order to cause this movement r(q(t)), for example can be determined with the Lagrange's equations of the first type, as disclosed for example in H. Bremer, Dynamik and Regelung mechanischer Systeme, [Dynamics and the regulation of mechanical systems] Teubner, Stuttgart, 1988. If the robot path q(t) is not known in advance, for example during operation forces which act in holding direction on the gripper 1 can likewise be estimated in model-supported manner by determination of the kinematic quantities $x_3$, $dx_3/dt$, $d^2 x_3/dt^2$ with (2). They can similarly be recorded for example by a force sensor between the pneumatic gripper 1 and the tool flange of the robot 2 bearing said pneumatic gripper if the reading is adjusted by the weight and inertia forces of the gripper 1.

Now in accordance with the invention a power of the peripheral component or of the gripper 1, in the exemplary embodiment the number of its suction nozzles connected to the low-pressure reservoir and thus consuming power from said low-pressure reservoir or exerting force on the load 3, is set on the basis of the force $F_1$ determined as described above, said force which must act dependent on the robot path x3(t) between the gripper 1 and the load 3, in order to hold the load on the gripper. In FIG. 2C to this end the respective set suction power of the pneumatic gripper 1 for the speed profile shown in solid lines in FIGS. 2A, 2B is marked end time T and the respective activated suction nozzles are indicated 1a, 1B or 10. One recognizes that the power of the pneumatic gripper 1 is value discretized by the connection and disconnection of suction nozzles and, following the course of the constraining force F1, is set dependent on the robot path $x_3(t)$. In the process the set power always exceeds the required constraining force, as arises from the weight and inertia force of the payload 3. This also applies when in an override mode the speed profile changes, in the exemplary embodiment the path within the time T' is traveled more rapidly (in dotted lines in FIG. 2). For example this can be accounted for by a renewed determination of the constraining force F1 in accordance with (3) with the substitution T→T' or by the fact the suction power determined for the initial path is multiplied by (T'/T).

By having the gripper always exert the minimum required force plus a certain safety reserve by setting its power, on the one hand a reliable lifting of the load is ensured and at the same time the energy consumption of the peripheral component, in this case the low-pressure removal from the low-pressure reservoir, is minimized.

In the process the setting of the power, as symbolically indicated in FIG. 2C, takes place discretized by optional connection and disconnection of specified suction nozzles 1A:1C, wherein in FIG. 2C active suction nozzles connected to the low-pressure reservoir are shown filled in. As can be recognized from FIG. 2C, during the positive acceleration phase ($0 \leq t < T/2$) all three suction nozzles 1A-1C are activated, while during the negative acceleration phase (T2≤t<T) only the central suction nozzle 1B is active, and during the holding the two external suction nozzles 1A, 1C are active, so that a symmetrical arrangement arises in each case which keeps the load statically stable and does not exert any tilting moment on the load 3.

The above example makes it clear that during operation in the case of the inventive control of the peripheral component 1 by optional connection or disconnection of the individual suction nozzles 1A-1C between payload 3 and pneumatic gripper 1 a force acts which is determined from the cross-sectional area of the active nozzles and the low pressure present in said nozzles. This force is always selected so that it exceeds the force $F_1$ explained above with sufficient safety reserve.

Correspondingly in the exemplary embodiment the inner force F1 between gripper 1 and load 3 can be determined. This can, as explained above, take place in model-supported manner with the mechanical substitute model (1) by calculating the constraining force which is necessary to cause the predefined movement, i.e. the carrying along of the load 3 by the robot gripper 1. This, as can be seen from the exemplary embodiment, does not correspond to the entire force that actually acts between the gripper 1 and load 3. This arises from the number and active surface of the active suction nozzles 1A, 1B, 1C and the low pressure present in them and is set in accordance with the invention such that it exceeds the constraining force. Similarly however, in a variation not shown an actual force acting between gripper 1 and load 3 can also be recorded, for example by a force sensor. By now setting the force exerted by the gripper 1 such that a tensile force acting between gripper 1 and load 3 determined by a force sensor is minimum and in the process remains positive, the energy consumption of the gripper 1 can likewise be minimized.

It is, as made clear from the exemplary embodiment, also possible to estimate the outer force as the sum of weight and inertia force and to use it as a basis for the setting of the power of the gripper 1, since the holding force exerted by said gripper of this outer force must always at least hold the equilibrium. This can, in turn, take place in model-supported manner with (1). Similarly a measurement of the outer force is also possible here, for example by having a force sensor record the force in x-direction between gripper 1 and robot 2, said force which the gripper 1 exerts with load 3 on the robot 2, and determining from this by deduction of the weight and inertia force of the gripper 1 the outer force on the payload 3 and thus the power to be applied by the pneumatic gripper 1.

If, for example by actuating an emergency stop button (not shown in the figure) an emergency stop is triggered, regardless of the current robot path all suction nozzles will always be activated so that they exert a predefined maximum possible holding force and thus in the event of the braking process of the robot induced by the emergency stop a loss of the load 3 due to the high delays occurring in the process is prevented.

If an emergency stop of the category STOP 1 or STOP 2 is triggered, in which case the robot travels a braking ramp by motor, in order to come to an idle state as quickly as possible; the start of this braking ramp will be delayed by a few milliseconds. This gives the pneumatic gripper time, to activate all suction nozzles as explained above and thus during the entire braking ramp make available the maximum possible holding force.

LIST OF REFERENCE SYMBOLS

1 Pneumatic gripper (peripheral component)
1A-1C suction nozzle
2 Robot (system)
3 Payload (workpiece)

I claim:
1. A method for controlling a peripheral component operatively associated with a robot of a robot system, the method comprising:
   determining at least one pose of the robot of the robot system;
   setting a power of the peripheral component with a controller on the basis of a determined force which acts dependent on the at least one determined robot pose, the determined force being determined in advance based on a model which represents movement dynamics of the robot system, the power of the peripheral component is adjusted during an operation of the determined force which varies depending on at least one robot path;
   wherein:
      the power of the peripheral component is set on the basis of the determined force when no override signal is present such that power consumption by the peripheral component is minimized;
      the power of the peripheral component is set to a predefined value when an override signal is present; and
   moving the peripheral component with the robot, controlled by the controller, while the power is set.
2. The method according to claim 1, wherein the determined force upon whose basis the power of the peripheral component is set is estimated, and/or is recorded.
3. The method according to claim 2, wherein the determined force upon whose basis the power of the peripheral component is set is adjusted during an operation of the robot system.
4. The method according to claim 1, wherein the determined force upon whose basis the power of the peripheral component is set comprises a state-dependent force.
5. The method according to claim 4, wherein the force upon whose basis the power of the peripheral component is set comprises an inner force and/or an outer force which acts on the peripheral component or a robot-guided workpiece.
6. The method according to claim 1, wherein the peripheral component is robot-guided or stationary, and/or wherein the peripheral component comprises a tool.
7. The method according to claim 1, wherein a magnitude of the power of the peripheral component is set continuously or discretized.
8. The method according to claim 1, wherein the power of the peripheral component is set continuously or discretized dependent on a robot path.
9. The method according to claim 1, wherein a minimum power of the peripheral component is set.
10. A device for controlling a peripheral component operatively associated with a robot of a robot system, comprising:
   a setting and computing means for setting a power of the peripheral component,
   wherein the device includes program code stored on a non-transitory storage medium that, when executed by the device, causes the device to:
      determine at least one pose of the robot of the robot system;
      set a power of the peripheral component with the setting and computing means on the basis of a determined force which acts dependent on the at least one determined robot pose, a power of the peripheral component with a controller on the basis of a determined force which acts dependent on the at least one determined robot pose, the determined force being determined in advance based on a model which represents movement dynamics of the robot system, the power of the peripheral component is adjusted during an operation of the determined force which varies depending on at least one robot path; and move the peripheral component with the robot while the power is set;

wherein:

the power of the peripheral component is set on the basis of the determined force when no override signal is present such that power consumption by the peripheral component is minimized, and the power of the peripheral component is set to a predefined value when an override signal is present.

11. A computer comprising a non-transitory storage medium including program code that, when executed by the computer, causes the computer to:

determine at least one pose of a robot of a robot system;

specify a power of a peripheral component operatively associated with the robot of the robot system on the basis of a determined force which acts dependent on the at least one determined robot pose, wherein the at least one determined robot pose is defined by at least one robot path, the determined force being determined in advance based on a model which represents movement dynamics of the robot system, the power of the peripheral component is adjusted during an operation of the determined force which varies depending on the at least one robot path;

wherein:

the power of the peripheral component is set on the basis of the determined force when no override signal is present such that power consumption by the peripheral component is minimized, and the power of the peripheral component is set to a predefined value when an override signal is present; and move the peripheral component with the robot, while the power is set.

12. The method according to claim 1, wherein the power of the peripheral component is a force.

13. The method according to claim 1, wherein the power of the peripheral component is set on the basis of the determined force when no emergency stop signal is present.

14. The method according to claim 2, wherein:

the force upon whose basis the power of the peripheral component is set is recorded during the operation of the robot system.

15. The method according to claim 3, wherein the force upon whose basis the power of the peripheral component is set is adjusted during an operation of the robot system according to a speed.

16. The method according to claim 4, wherein the force upon whose basis the power of the peripheral component is set comprises a movement-dependent and/or pose-dependent force.

17. The method according to claim 5, wherein the outer force is at least one of a weight force, an inertia force, or a process force.

18. The method according to claim 6, wherein the peripheral component comprises a holding tool for holding a workpiece.

19. The method according to claim 7, wherein the magnitude of the power of the peripheral component is set discretized by connection or disconnection of elements of the peripheral component.

20. The method according to claim 8, wherein the power of the peripheral component is set discretized by switching points identified along the robot path.

21. The method of claim 1, wherein the determined force is estimated in advance.

* * * * *